A. B. LAWTHER.
Machine for Crushing Oleaginous Seeds.
No. 161,691. Patented April 6, 1875.
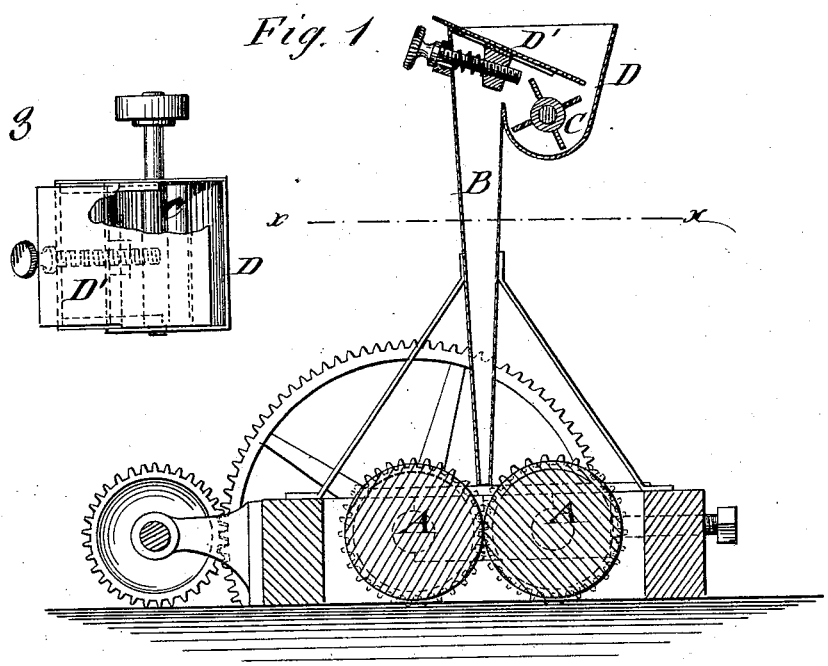
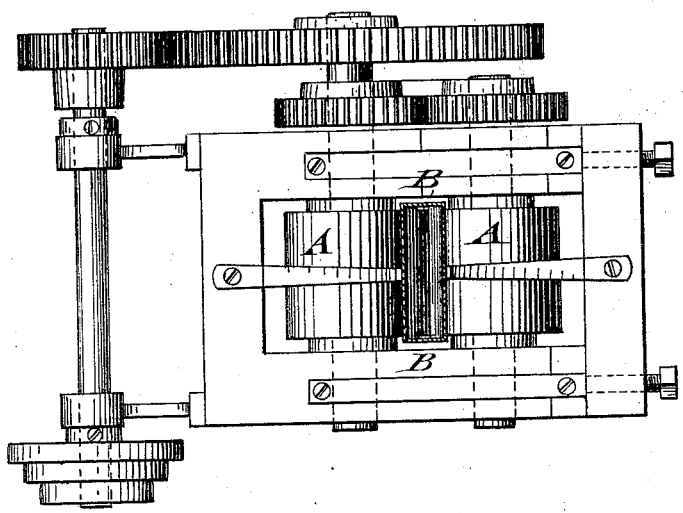
WITNESSES:
C. Neveux
J. H. Scarborough
INVENTOR:
A. B. Lawther
BY
ATTORNEYS.

UNITED STATES PATENT OFFICE.

ALFRED B. LAWTHER, OF CHICAGO, ILLINOIS.

IMPROVEMENT IN MACHINES FOR CRUSHING OLEAGINOUS SEEDS.

Specification forming part of Letters Patent No. 161,691, dated April 6, 1875; application filed March 6, 1875.

*To all whom it may concern:*

Be it known that I, ALFRED B. LAWTHER, of Chicago, in the county of Cook and State of Illinois, have invented a new and Improved Machine for Crushing Oleaginous Seeds, of which the following is a specification:

In the accompanying drawing, Figure 1 represents a vertical longitudinal section of my improved machine for crushing oleaginous seeds; Fig. 2, a top view of the same, partly in section, on the line $x\,x$, Fig. 1; and Fig. 3, a detail top view of the seed-feeding mechanism.

Similar letters of reference indicate corresponding parts.

The object of my invention is to provide, for the purpose of crushing flax-seeds, linseeds, and other oil-seeds, an improved machine, by which the oil-cells of the seeds are broken in uniform manner, and no part of the seed reduced into pasty condition, so as to obtain a more perfect yield of oil without the the use of edge-runners or muller-stones.

Hitherto the oil-seeds have been crushed between revolving rollers of light construction, which exerted no great pressure on the seeds, and produced thereby an imperfect crushing action, that had to be completed by passing the partly-crushed seeds under heavy edge-runners or muller-stones, and throwing at the same time a quantity of water thereon, and mixing it to the seeds by the action of the stones, and stirrers belonging thereto. The seeds were then further stirred in heated reservoirs, and pressed for obtaining the oil. This process is an imperfect one, because the muller-stones operate alike on all portions of the seed, as well on the finer as on the coarser portion, so that when the action of the muller-stones is continued long enough to properly prepare the coarser portions the finer portions will be overground, and rendered pasty, and the presses will not be able to expel the oil so completely as from a coarser meal. If the process is not continued long enough the coarser portion will be underground, and the full yield of oil not realized. The husks or bran of the seed is also ground too fine by the mullers, which is very undesirable, as they absorb in this state a certain quantity of oil which cannot be expelled by the presses.

For the purpose of overcoming these defects, and producing a uniformly-grained mass of crushed seed, I provide a machine with crushing-rollers of great power, to which the seed is fed, under certain pressure, by an upright supply-pipe, of suitable height, having a fluted feeding-roller and hopper at the top end.

In the drawing illustrating my invention, A A represent two powerful crushing-rollers, which are revolved in suitable bearings by gearings from the driving-shaft. The oil-seeds are fed to the rollers by a tapering feed-tube, B, which is placed intermediately and in vertical position above the same. As the oil-seeds do not readily pass to rollers under great pressure, they are fed through the tube under suitable pressure by means of a rotating fluted roller, C, arranged in a hopper, D, at suitable height above the rollers.

The oil-seeds are forced through the feed-pipe, and compelled to pass through the rollers, which, by the uniformity and power of their motion, crush the seeds and break the oil-cells completely, as nearly each seed is individually exposed to the action of the rollers, without reducing any portion to pasty condition, leaving also the husks or bran comparatively coarse, so that it may be seen in the cake after pressing.

The quantity of seed fed by the fluted top roller to the tube may be regulated by an inclined adjustable plate, D′, sliding on guides of the hopper D.

The crushed seeds are then passed to the mixing-and-moistening machine, doing entirely away with the muller-stones, and producing a greater yield of oil with less power, less labor, and less pressure on the oil-extracting presses. An open-grained cake is obtained that shows readily the seed used having a flaky condition, and splitting easily at right angles to the direction of pressure, being superior to the mulled seed-cake, which has no flaky nature, and breaks indifferently in any direction.

Having thus described my invention, I claim as new and desire to secure by Letters Patent—

An improved machine for crushing oleaginous seeds, composed of crushing-rollers, revolving at great pressure, in combination with an upright feeding-tube, through which the oil-seeds are forced, under suitable pressure, for being uniformly crushed by the rollers, substantially in the manner shown, and for the purpose described.

ALFRED B. LAWTHER.

Witnesses:
JAMES WRIGHT,
CHARLES F. HILLS.